United States Patent [19]

Knecht

[11] 4,129,852

[45] Dec. 12, 1978

[54] SLOPE DETECTOR FOR INDICATING FLAT TIRES AND THE LIKE

[76] Inventor: John E. Knecht, R.R. #3, St. Anne, Ill. 60964

[21] Appl. No.: 781,291

[22] Filed: Mar. 25, 1977

[51] Int. Cl.² .............................................. G01C 9/18
[52] U.S. Cl. ........................................ 340/58; 73/146; 200/52 A; 200/61.22; 200/61.47
[58] Field of Search ............... 340/52 R, 52 H, 58; 200/52 A, 61.22, 61.47, 61.52; 73/146, 146.2, 516 LM; 33/366

[56] References Cited

U.S. PATENT DOCUMENTS

| | | | |
|---|---|---|---|
| 1,662,381 | 3/1928 | Eynon | 340/58 |
| 1,714,501 | 5/1929 | Eynon | 340/58 |
| 2,155,865 | 4/1939 | Leavenworth et al. | 73/146.2 |
| 2,590,394 | 3/1952 | Franks | 200/52 |
| 2,607,836 | 8/1952 | Stevens | 340/58 |
| 2,728,230 | 12/1955 | Haramic | 340/58 |
| 2,893,134 | 7/1959 | Shea et al. | 33/206 |
| 3,024,662 | 3/1962 | Ryan | 73/516 |
| 3,442,023 | 5/1969 | Remington et al. | 33/206 |
| 3,614,122 | 10/1971 | Herren | 280/104.5 |

FOREIGN PATENT DOCUMENTS 2525698  2/1976  Fed. Rep. of Germany ............. 33/366

Primary Examiner—John W. Caldwell, Sr.
Assistant Examiner—Joseph E. Nowicki
Attorney, Agent, or Firm—Jerold A. Jacover

[57] ABSTRACT

A device for detecting a change in the slope of a member relative to a reference is disclosed. The device includes a slope sensor, mounted to the member, characterized by a resistance between one end of the slope sensor and an intermediate node, and a conductive fluid within the sensor which varies the effective resistance of the slope sensor between the end thereof and the node by an amount corresponding to the change in the slope of the member relative to the reference.

10 Claims, 10 Drawing Figures

SLOPE DETECTOR FOR INDICATING FLAT TIRES AND THE LIKE

BACKGROUND OF THE INVENTION

This invention relates generally to means for detecting a change in the slope of a member relative to a reference such as the horizontal. Slope detectors of the type described, when mounted on an axle of a vehicle, have greatest application as a flat tire detector. More particularly, when combined with appropriate circuitry, a slope detecting device may be used to warn the operator of a vehicle that one of the tires thereof has gone soft or flat. In certain situations, particularly when the vehicle includes a trailer, such a device would be an important safety feature since a flat tire on a trailer may otherwise go unnoticed by the vehicle operator for some time.

In the past, various slope detecting devices have been used to indicate that a tire of a vehicle had gone flat. One such device incorporated a pool of mercury inside a housing. When the slope of the housing changed, in response to the deflation of a tire, for example, the mercury pool would shift inside the housing, covering a pair of electrical contacts disposed near the end thereof. The mercury would have the effect of electrically closing the contacts, which were typically coupled to alerting means such as a lamp, to indicate that the tire had gone flat.

Such slope detecting devices were not without certain drawbacks. For example, some of the slope detectors of the prior art generally responded to changes in slope only when a predetermined threshold was exceeded. Thus, a gradually deflating tire would ordinarily go undetected until it was completely flat.

Certain slope detecting devices of the prior art, when used as a flat tire detector, also suffered from the further drawback that they sometimes falsely indicated the circumstance of a flat tire. Thus, if a spurious change in slope occurred, such as when one of the tires of the vehicle hit a pothole, a false indication of a flat tire would be given. Such falsing, of course, is highly undesirable. Though detectors were designed to prevent falsing, they were relatively cumbersome and inexpedient.

It is thus a primary object of this invention to provide an improved device for detecting a change in slope of a member relative to a reference. As set forth above, such a device would have great application on a vehicle as a flat tire detector.

It is another object of this invention to provide an improved slope detector capable of producing a detecting signal corresponding to the change in slope of a member relative to a reference.

A further object of the invention is to provide an improved slope detector, of particular use on a vehicle as a flat tire detecting device, which does not falsely indicate the occurence of a flat tire due to spurious slope variations such as those which may result when a tire of the vehicle hits a pothole.

Other objects, features and advantages of the invention will become more apparent hereinafter.

SUMMARY OF THE INVENTION

In accordance with the foregoing objects, this invention is characterized by a device for detecting a change in the slope of a member relative to a reference. The device includes electrical means, mounted to the member, having a resistance between one end of the electrical means and an intermediate node. The device further includes means for varying the effective resistance of the electrical means between the end thereof and the intermediate node by an amount corresponding to the change in the slope of the member relative to the reference.

DESCRIPTION OF THE DRAWINGS

The invention summarized above can be best understood by reading the following detailed description in conjunction with the accompanying drawings in which.

DETAILED DESCRIPTION OF EXEMPLARY EMBODIMENTS

What follows is a detailed description of exemplary embodiments of the invention. It should be understood, however, that these embodiments are merely illustrative, and should not be construed as limitative, the scope of the invention being defined in the appended claims.

Figure 1:
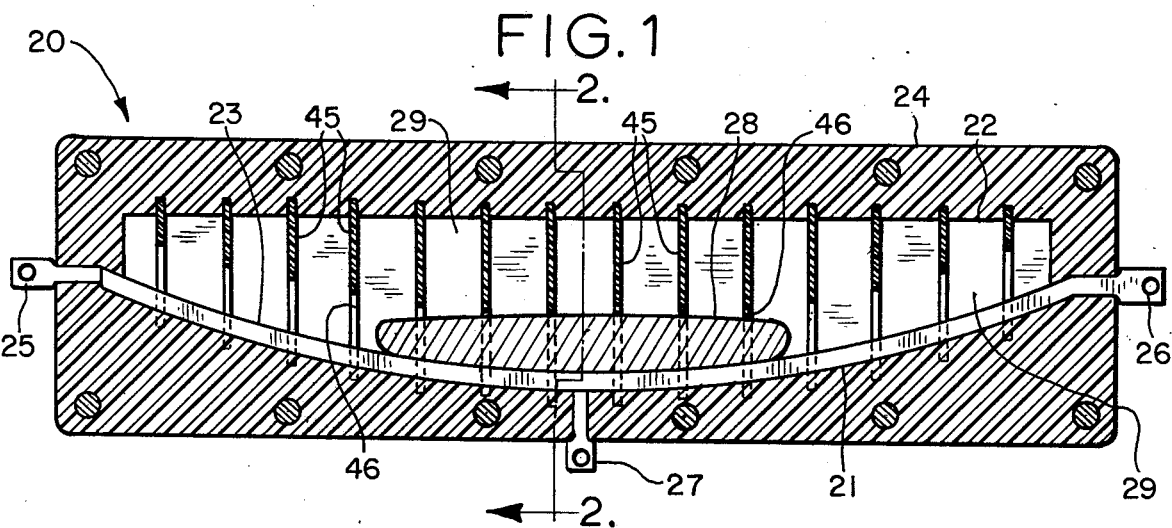
FIG. 1 is a schematic representation of an exemplary embodiment of a slope detecting device incorporating certain aspects of the invention.
Figure 2:
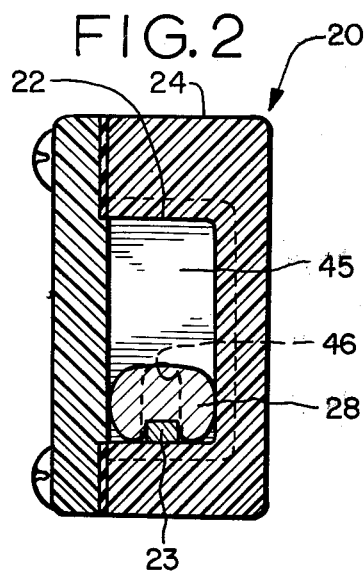
FIG. 2 is a sectional view, taken along lines 2—2 of FIG. 1.

Referring first to FIGS. 1 and 2, there is illustrated one exemplary embodiment of a slope detector represented generally by the reference numeral 20. Detector 20 includes a housing member 24 having an internal chamber 22. Chamber 22 has a curvilinear bottom wall 21 which is preferably defined by the arc of a circle of appropriate radius. In one aspect of the invention, a plurality of parallel restricting panels 45 extend upwardly from bottom wall 21 of chamber 22. Each of restricting panels 45 defines an aperture 46 whose purpose will be explained hereinafter.

Disposed within chamber 22, preferably along bottom wall 21, are electrical means which, in this aspect of the invention are defined by a resistance coating or resistance wire 23. Resistance wire 23 has a pair of ends 25, 26, and an intermediate node 27 preferably located midway therebetween. As explained in greater detail in connection with FIG. 8, ends 25, 26 and intermediate node 27 of resistance wire 23 form part of an electrical circuit which, in turn, may be used in a vehicle as a flat tire detector.

Paritally filling chamber 22 of slope detector 20, is a quantity of electrically conductive fluid 28 which serves to short-circuit a portion of resistance wire 23. In this exemplary embodiment fluid 28 is mercury, though those skilled in the art will recognize that other fluids may work substantially equally as well. The remainder of chamber 22 is preferably filled with an inert gas 29 such as nitrogen, to prevent oxidation of the mercury comprising fluid 28.

When housing member 24, containing chamber 22, is parallel relative to a horizontal reference, fluid 28 is distributed along bottom wall 21 with substantially equal quantities on either side of node 27. Further, it is preferred that, when housing member 24 is so oriented, fluid 28 covers one-half of resistance wire 23. This enables fluid 28 to fully short resistance wire 23 on either side of node 27, depending upon the orientation of housing member 24. When the slope of housing member 24 is altered, however, fluid 28 flows along bottom wall 21 toward the lowermost of ends 25, 26 of resistance wire 23. When fluid 28 so flows, a greater portion of resistance wire 23 between the lowermost of ends 25, 26 and node 27 will be short-circuited by fluid 28 than the portion of resistance wire 23 between the uppermost of ends 25, 26 and node 27. Thus, the effective resistance of resistance wire 23 between the lowermost of ends 25, 26 and node 27 is changed by an amount corresponding to the alteration in the slope of housing member 24. Due to the configuration of chamber 22, particularly bottom wall 21, this change in the effective resistance of resistance wire 23 between the lowermost of ends 25, 26 and node 27 can be made directly proportional to the change in the slope of housing member 24.

As explained above, a plurality of parallel restricting panels 45, each defining an aperture 46, are disposed inside chamber 22. With restricting panels 45 so disposed, fluid flow through chamber 22 can only occur by the passage of fluid 28 through apertures 46. Restricting panels 45 thus tend to dampen the responsiveness of fluid flow through chamber 22 when the slope of housing member 24 is altered. This prevents the effective resistance of resistance wire 23 from changing substantially immediately if the slope of housing member 24 is altered due to some transient cause. In this way slope detector 20 will not give a false indication when a spurious change in slope has occurred.

Figure 4:
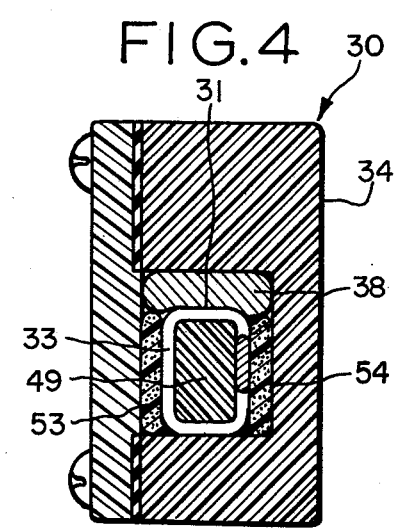
FIG. 4 is a sectional view taken along lines 4—4 of FIG. 3.
Figure 3:
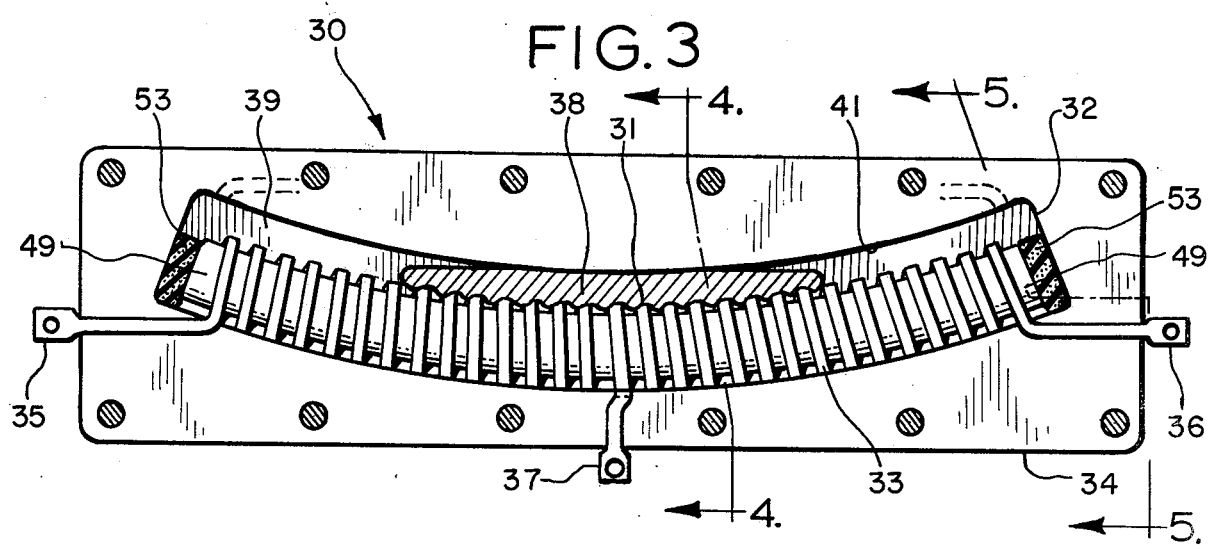
FIG. 3 is a schematic representation of an alternative embodiment of the slope detecting device illustrated in FIG. 1.

An alternative slope detector 30 is illustrated in FIGS. 3 and 4. Slope detector 30 preferably includes a housing member 34 having a chamber 32 similar to housing member 24 and chamber 22 of slope detector 20. Chamber 32, however, includes a core member 49 having a curvilinear top wall 31 preferably defining an arc of a circle of appropriate radius. Electrical means, in the form of a helical resistance wire 33 are wound about core 49. Resistance wire 33 has a pair of ends 35, 36 and an intermediate node 37, similar to ends 25, 26 and node 27 of resistance wire 23.

Slope detector 30 further includes a quantity of electrically conductive fluid 38, such as mercury, partially filling a space 41 between top wall 31 and the top of chamber 32. The remainder of chamber 32 is preferably filled with an inert gas 39 for reasons already set forth. In a manner similar to that explained in connection with the discussion of FIGS. 1 and 2, when the slope of housing member 34 is altered from a horizontal orientation, fluid 38 short-circuits a greater portion of resistance wire 33 between the lowermost of ends 35, 36 and node 37 than the portion of resistance wire 33 between the uppermost of ends 35, 36 and node 37. This, of course, changes the effective resistance of resistance wire 33 between the lowermost of ends 35, 36 and node 37 by an amount corresponding to the alteration in the slope of housing member 34 relative to the horizontal.

It has been found that the configuration of slope detector 30 is, in some respects, more advantageous than that of slope detector 20. For example, resistance wire 23 of slope detector 20 is characterized by a relatively small resistance per length of chamber 23; approximately five ohms per foot is typical. Under such circumstances, a relatively low voltage—substantially lower than the 12 volt battery systems used in many conventional vehicles—would be desirable to prevent the production of relatively large currents and the concomitant high $I^2R$ losses in resistance wire 23. Because of its helical winding about core 49, however, the resistance of resistance wire 23 of slope detector 30 has a relatively high value per length of chamber 32. As a result, the curent through resistance wire 33, and hence the associated $I^2R$ losses, is relatively low even when the full 12 volts from conventional vehicle battery systems are applied.

Another advantage of the configuration of slope detector 30 is that restricting panels 45 can be eliminated without losing the benefits of damping fluid flow through the chamber to prevent the slope detector from undesirably responding to transient effects. This is accomplished by the provision of the relatively narrow space 41, confining fluid 38. Since a substantial portion of fluid 38 flowing through space 41 is in contact with the surfaces of top wall 31 and chamber 32, there is sufficient friction to dampen fluid flow. More particularly, it has been found that when space 41 has a width of $\frac{1}{4}$ inch and a height of $\frac{1}{8}$ inch, fluid 38, such as mercury, will be sufficiently dampened to inhibit falsing due to spurious changes in the slope of housing member 34.

Figure 5:
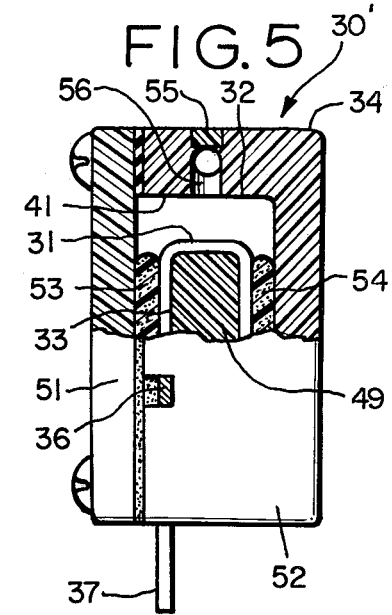
FIG. 5 is a sectional representation of a modified form of the slope detecting device illustrated in FIG. 3.

In actuality, it is preferred that the configuration of the slope detector shown in FIGS. 3 and 4 be modified to conform to that of slope detector 30' illustrated schematically in FIG. 5. Slope detector 30' is similar to slope detector 30 except that provision is made to define an escape path 56 for gas 39 so that fluid 38 can displace the same as it flows through space 41. More particularly, it is preferred that slope detector 30' including a housing 34' fabricated from two subassemblies 51 and 52. A pair of gaskets 53 and 54 are secured, respectively, between resistance wire 33 wound about core 49, and the interior walls of subassemblies 51 and 52. Gaskets 53 and 54 thus prevent fluid 38 from leaking out of space 41.

Escape path 56 is defined by subassemblies 51 and 52 so that gas 39 can be displaced by fluid 38. Thus, when fluid 38 flows toward one end of chamber 32, gas 39 will pass through escape path 56, and re-enter space 41 at the opposite end of chamber 32. To prevent leakage from escape path 56, sealing means 55 are disposed between the upper portions of subassemblies 51 and 52 as shown in FIG. 5. The surface tension of fluid 38 prevents fluid from entering escape path 56 due to the relatively small cross-section thereof.

Figure 6:
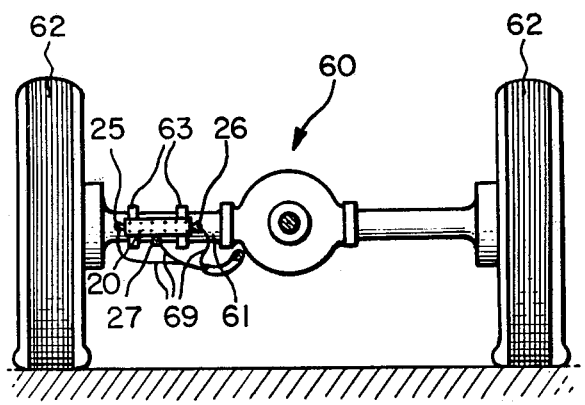
FIG. 6 is a schematic representation of a slope detector incorporating certain aspects of the invention, such as the slope detecting device illustrated in FIG. 1, mounted on the rear axle of a vehicle.
Figure 7:
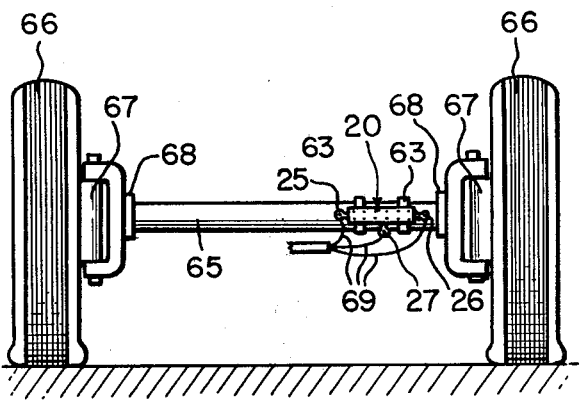
FIG. 7 is a schematic representation of a slope detecting device of the type illustrated in FIG. 6, mounted on a false front axle of a vehicle.

FIGS. 6 and 7 illustrate how a slope detecting device, such as slope detector 20, may be mounted to the axles of a vehicle. It should be noted, however, that as used herein a vehicle may be any applicable conveying medium, including the combination of a towing and towed conveyance, or a towing or towed conveyance individually. For exemplary purposes only, FIG. 6 illustrates an automobile 60 having a rear axle 61. Disposed at each end of axle 61 is an inflatable tire such as the single tire 62. A slope detector 20 may be mounted on axle 61 by a plurality of bolts 63 with lead lines 69 emanating from ends 25, 26 and node 27 of resistance wire 23. It should be appreciated that slope detector 20 could be similarly mounted on any axle of any towed or towing conveyance.

For most accurate results, it has been found that a slope detector 20 can be mounted on the front axle of an automobile in the manner illustrated in FIG. 7. In particular, it is desirable to provide a telescoping false axle 65 attached by bracket means 68 to the center supports of wheel structures 67 on which tires 66 are mounted. Bolts 63 may then be used to secure slope detector 20 to false axle 65, with lead lines 69 emanating from ends 25, 26 and node 27 of resistance wire 23.

Figure 8:
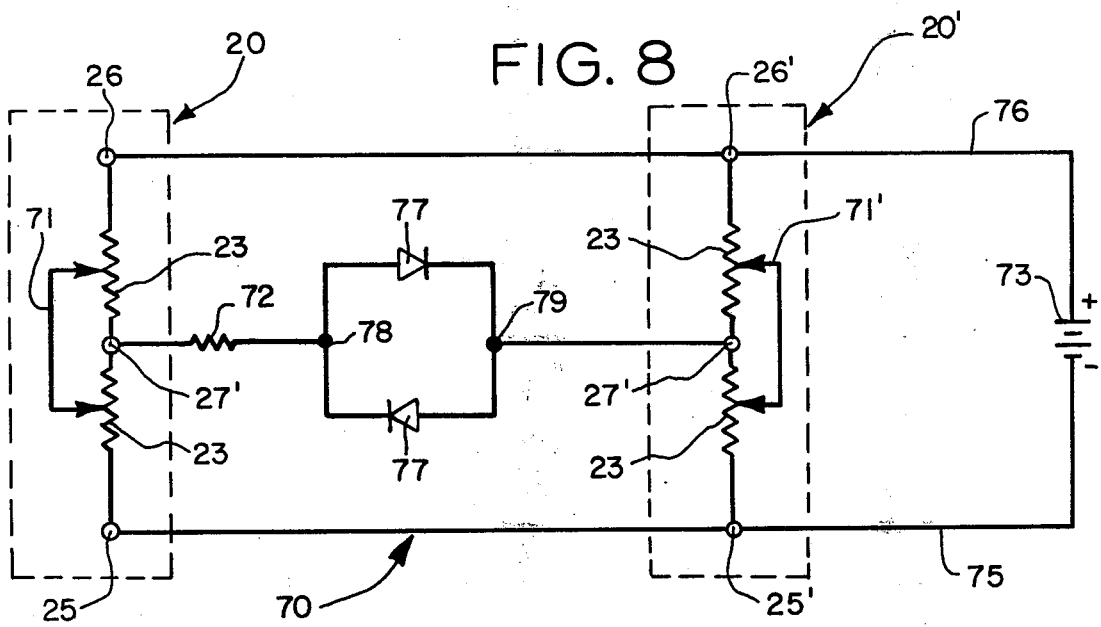
FIG. 8 is a circuit diagram of a flat tire detector incorporating slope detecting devices of the type illustrated schematically in FIGS. 6 and 7.

Referring now to FIG. 8, there is shown a circuit comprising an exemplary flat tire detector 70 for any applicable vehicle, utilizing a pair of slope detectors 20 and 20'. Each of slope detectors 20 and 20' are similar to any of the various slope detectors described hereinbefore and each serves as a reference for the other. Accordingly, each of slope detectors 20 and 20' have, respectively, a resistance wire 23 and 23', and means 71 and 71' for varying the effective resistance thereof. Though in FIG. 8 means 71 and 71' are shown schematically as movable taps, it should be recalled that it is preferred that such means comprise a quantity of electrically-conductive fluid adapted to short-circuit appropriate portions of the resistance wires.

Circuit 70 preferably includes a voltage source 73 having a positive terminal connected to a conductor 76 and a negative or ground terminal connected to a conductor 75. Conductor 76 is coupled to ends 26 and 26' of resistance wires 23 and 23', respectively, and conductor 75 is coupled to ends 25 and 25' of resistance wires 23 and 23', respectively. Circuit 70 further includes a current-limiting resistor 72, having one end coupled to node 27 intermediate ends 25 and 26 of resistance wire 23, and the other end coupled to a junction 78. Junction 78 is, in turn, coupled to one input of a parallel combination of oppositely-oriented light-emitting diodes 77. Another input of the combination of diodes 77 is coupled to a junction 79 which is, in turn, coupled to node 27' intermediate ends 25' and 26' of resistance wire 23'.

In operation, slope detectors 20 and 20' may be installed, respectively, on two axles of a vehicle. These may be the front and rear axles of an automobile, the combination of the rear axle of an automobile and an axle of a trailer towed thereby, or any other desired combination. Slope detectors 20 and 20' are then interconnected in the manner exemplified by circuit 70 of FIG. 8.

When each of the axles to which slope detectors 20 and 20' are mounted are at the same slope, the means identified by reference numerals 71 and 71' respectively short-circuit equal portions of resistance wires 23 and 23' on both sides of nodes 27 and 27'. As a result, nodes 27 and 27' are at the same potential, whereby substantially no current flows through either of diodes 77. Significantly, this situation exists when the vehicle is on either a flat or banked surface, or when the vehicle is subject to centrifugal forces such as when it rounds a banked curve.

However, if the slope of the axle to which one of the slope detectors is mounted changes relative to the slope of the axle to which the other slope detector is mounted, a different condition arises. More particularly, if, for example, the tire nearest end 26 comprising slope detector 20 goes flat, means 71 will short-circuit an increased portion of resistance wire 23 between end 26 and node 27, and a decreased portion of resistance wire 23 between end 25 and node 27. Because the axle to which slope detector 20' is mounted remains parallel to the road surface, the occurrence of a flat tire on the other axle has no substantial effect on the portion of resistance wire 23' short-circuited by means 71'. Since the effective resistance of resistance wire 23 between node 27 and end 26 is now less than the effective resistance of resistance wire 23' between node 27' and end 26', the potential at node 27 exceeds that at node 27', whereby a current in the form of a detecting signal flows from conductor 76 to conductor 75 via end 26 of resistance wire 23, the appropriately oriented one of diodes 77, and node 27' of resistance wire 23'. Since the change in the effective resistance between node 27 and end 26 is directly proportional to the alteration in the slope of the axle to which slope detector 20 is mounted, the potential difference between nodes 27 and 27', and hence the strength of the detecting signal, is also proportional to that alteration in slope.

In accordance with the known operation of light-emitting diodes, the detecting signal will cause an appropriate one of diodes 77 to illuminate, indicating that a tire has gone flat—in this case the tire nearest end 26 of resistance wire 23. Of course, if the tire mounted closest to end 25 of resistance wire 23 had gone flat, the potential at node 27' would exceed that at node 27, producing a detecting signal to illuminate the other one of diodes 77. Similarly, if either of the tires located on the axle to which slope detector 20' is mounted went flat, detecting signals would be passed through an appropriate one of diodes 77 to indicate that condition.

Figure 9:
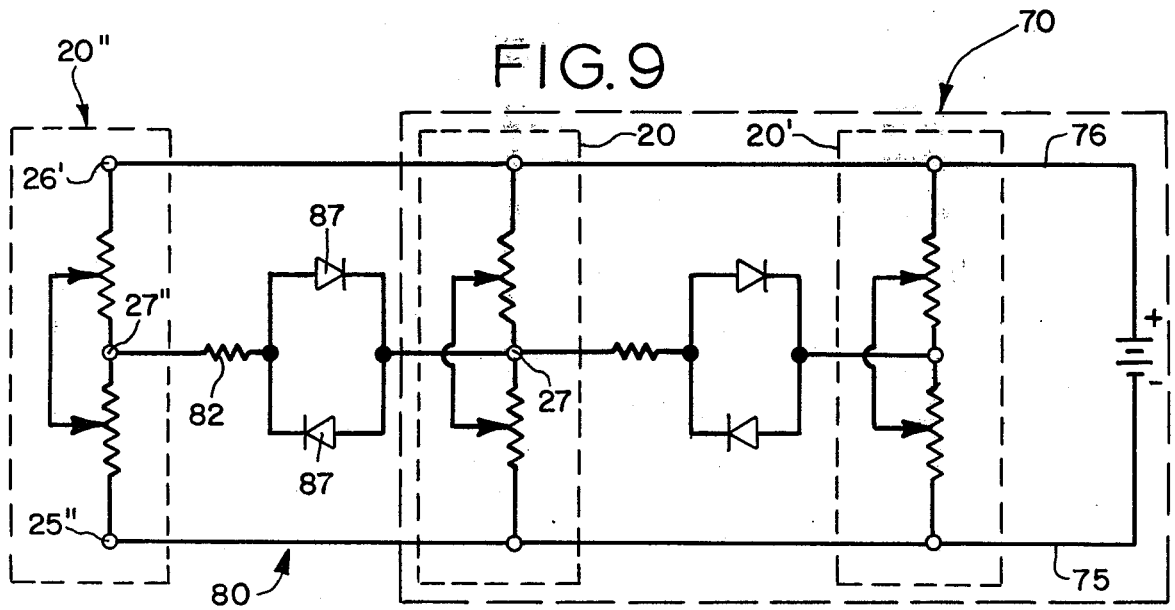
FIG. 9 is a circuit diagram of a flat tire detector for use in connection with a vehicle having three axles.

It should be understood that the flat tire detector shown in FIG. 8 can be applied to any number of axles with appropriate circuit modifications. Thus, there is shown in FIG. 9 a circuit 80 which is adapted to use with a three-axle vehicle. Circuit 80 is identical to circuit 70 except that a third slope detector 20" and certain additional circuit elements are included. More particularly, slope detector 20" includes ends 25" and 26" which are coupled, respectively, to conductors 75 and 76 of circuit 70. Similarly, node 27" intermediate ends 25" and 26" is coupled through a current-limiting resistor to one input of the combination of a pair of diodes 87 of similar type and orientation as diodes 77. The other input of the combination of diodes 87 is coupled to node 27 of slope detector 20. It will be appreciated that the flat tire detector of circuit 80 operates in substantially the same manner as the flat tire detector of circuit 70, and therefore no further explanation is believed to be necessary.

Figure 10:
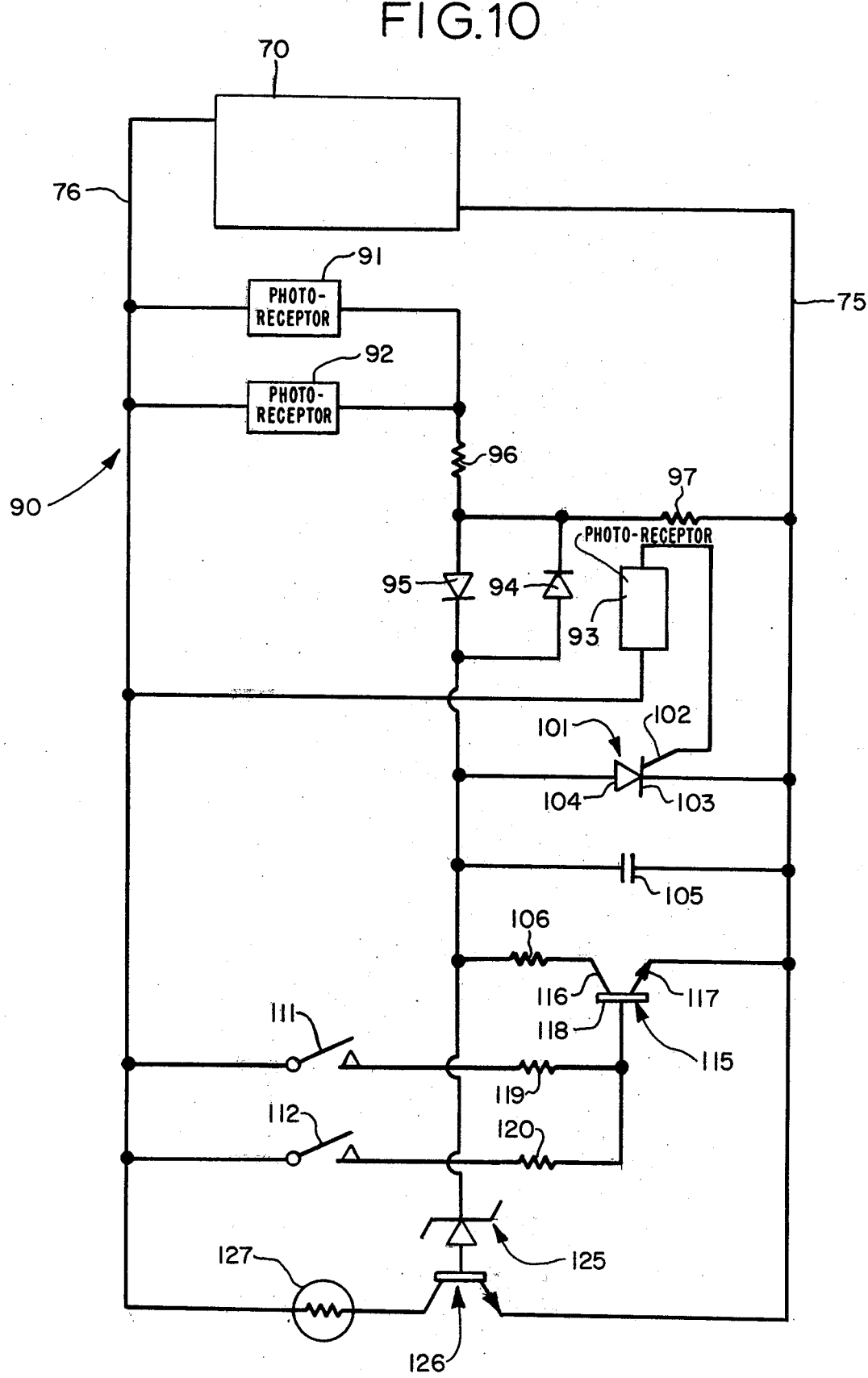
FIG. 10 is a circuit diagram of a modified form of the flat tire detector illustrated in FIG. 8.

FIG. 10 illustrates a circuit 90 incorporating the circuit 70, including conductors 76 and 76 of FIG. 8. Circuit 90 further includes a pair of photoreceptors 91 and 92, in light-receiving relation with a respective one of diodes 77 of circuit 70. Photoreceptors 91 and 92 are each coupled between conductor 76 and a current-limiting resistor 96. Thus, when either of diodes 70 are illuminated, indicating a flat tire condition, an appropriate one of photoreceptors 91 and 92 becomes conductive, causing current to flow through resistor 96 and a diode 95 serially coupled thereto. This current serves to slowly charge a capacitor 105, coupled between the cathode of diode 95 and conductor 75.

Also coupled to the cathode of diode 95 of a Zener diode 125 oriented so that there can be no conduction therethrough until the charge on capacitor 105 exceeds the breakdown voltage of diode 125. The anode of diode 125 is coupled to the base of a switching transistor 126, having its emitter coupled to conductor 75 and its collector coupled through an alarm 127 to conductor 76. Alarm 127 may take the form of a buzzer, lamp, or similar apparatus to warn the operator of a vehicle that a tire has gone flat.

It should be clear that capacitor 105 must become sufficiently charged before transistor 126 will be rendered conductive to actuate alarm 127. This, of course, occurs only when photoreceptors 91, 92 are held conductive for at least a minimal predetermined time dependent upon the parameters of circuit 90. Since the conduction of photoreceptors 91, 92 depends, in part, on the duration of the illumination of diodes 77, a transient change in slope of spurious origin will not activate the alarm.

It should be further noted that the conduction of photoconductors 91, 92 is also determined by the amount of current flowing through one of diodes 77, i.e., the strength of the detecting signal. Since the strength of the detecting signal is proportional to the change in slope of an appropriate axle, a dramatic change in slope will maximize the conduction of photoreceptors 91, 92, and thus maximize the charging rate for capacitor 105. This, in turn, hastens actuation of alarm 127, perhaps within the minimal predetermined time determined by the circuit parameters. Conversely, when a less dramatic change in slope occurs, the charging rate for capacitor 105 is reduced, thereby causing alarm 127 to be actuated only after a substantial delay.

Circuit 90 also includes means for discharging capacitor 105. Such means include a light-emitting diode 94, having its cathode coupled through a resistor 97 to conductor 75, and its anode coupled to the cathode of diode 95. Placed in light-receiving relation with diode 94 is a photoreceptor 93 which is coupled between conductor 76 and a gate electrode 102 of a silicone-controlled rectifier 101. The cathode 103 of rectifier 102 is connected to conductor 75, and the anode 104 of rectifier 101 is coupled to the cathode of diode 95.

It should be understood that, due to the swaying of a vehicle on the road, for example, small relative imbalances frequently occur. Each of these imbalances can contribute a small charging current for capacitor 105. The accumulation of this charge on capacitor 105 could produce a false indication of a flat tire. To prevent the occurrence of such a false indication, means are provided for discharging capacitor 105 every time one of these small, relative imbalances cease, thereby producing such accumulation of charge on capacitor 105. More particularly, when photoreceptors 91, 92 cease conducting, capacitor 105 discharges through diode 94, resistor 97 and conductor 75. As current passes through diode 94, illuminating the same, photoreceptor 93 conducts triggering rectifier 101. The triggering of rectifier 101 promotes the discharge of capacitor 105.

There is also provided in circuit 90 a resistor 106 coupled to the collector 116 of a transistor 115. The emitter 117 of transistor 115 is conducted to conductor 75, and the base 118 is coupled through a resistor 119 and a normally-open switch 111 to conductor 76. Base 118 of transistor 115 is also coupled through a second resistor 120 and a second normally-open switch 112 to conductor 76.

When circuit 90 is used as a flat tire detector on a vehicle having an automatic transmission, switch 111 is arranged to be closed upon actuation of the brake pedal, and switch 112 is arranged to be closed upon moving the gear shift lever to the "park" or "neutral" position; when circuit 90 is used as a flat tire detector on vehicles having a standard transmission, switch 111 is arranged to be closed upon actuation of the clutch, and switch 112 is arranged to be closed upon moving the gear shift lever to the "neutral" position.

When either of switches 111 or 112 are closed, a signal is applied to base 118, thereby rendering transistor 115 conductive. When transistor 115 conducts, a discharge path for capacitor 105 is provided via resistor 106, collector 116, emitter 117 and conductor 75. As a result, when either of switches 111 or 112 are closed, alarm 127 will not be actuated even if the appropriate axles of the vehicle are sloping relative to one another. This, of course, permits the vehicle to be stopped or parked on uneven terrain without actuating the alarm.

Summarizing the operation of circuit 90, when a tire goes flat, current will pass through an appropriate one of diodes 77, causing one of photoreceptors 91, 92 to conduct. As a result, capacitor 105 begins to charge, and when the charge thereon exceeds the breakdown voltage of Zener diode 95, switching transistor 126 is turned on. When switching transistor 126 is turned on, current passes through alarm 127 which operates to indicate the aforementioned flat tire condition. Since photoconductors 91, 92 must be held conductive for at least a predetermined minimal time in order to build up sufficient charge on capacitor 105 to overcome the breakdown voltage of diode 95, alarm 127 will not be operated when a spurious change in slope occurs.

When photoreceptors 91, 92 cease conducting, capacitor 105 discharges via the path defined by light-emitting diode 94, resistor 97 and connector 75. Upon discharge of capacitor 105, switching transistor 126 turns off and alarm 127 stops operating. The passage of current through diode 94 causes photoreceptor 93 to conduct, thereby triggering rectifier 101. This speeds up the rate of discharge of capacitor 105 for reasons explained hereinbefore. Capacitor 105 is also discharged upon closure of either of switches 111, 112 to permit the vehicle to be stopped or parked on uneven terrain without alarm 127 being rendered operative.

What has been described is a novel slope detecting device having great application as a flat tire detector for a vehicle. The device, in its various embodiments, provides substantial improvements over the prior art. It should be appreciated, however, that numerous refinements in the embodiments disclosed which do not part from the true scope of the invention will become apparent to those skilled in the art. Accordingly, all such refinements are intended to be covered by the appended claims.

I claim:

1. In a vehicle having an axle and an inflatable tire disposed at each end of the axle, a device for detecting when one of the tires becomes underinflated, comprising:

a slope detector, mounted to the axle, including a curved chamber, an electrically conducting fluid partly filling the chamber, and a resistance element disposed in the chamber in partial contact with the fluid, said resistance element characterized by a resistance between one end of the element and an intermediate node which varies in a predetermined manner with the position of the fluid in the chamber;

means for damping the flow of the fluid to reduce the rate of change of the resistance of the detector caused by movement of the axle and thereby to render the detector substantially insensitive to axle vibration associated with road travel; and means responsive to the resistance of the detector for detecting variations in the slope of the axle.

2. The device of claim 1 wherein the damping means includes a surface of the curved chamber adapted to contact the surface of the conductive fluid to frictionally retard motion of the fluid.

3. The device of claim 1 wherein the chamber is adapted to confine the conducting fluid to a substantially uniform cross-sectional area to damp the flow of the fluid.

4. The device of claim 3 wherein the cross-sectional area of the confined fluid is about three-one hundredths of a square inch and the conducting fluid includes mercury.

5. The device of claim 1 wherein the chamber is curved in a substantially circular arc.

6. In a vehicle having first and second axles and an inflatable tire disposed at each end of each of the axles, a device for detecting when one of the tires becomes underinflated, comprising:

a plurality of slope detectors, one of the slope detectors mounted on each of the axles, each of the slope detectors including a curved chamber, an electrically conducting fluid partially filling the chamber, and a resistance element disposed in the chamber in partial contact with the fluid, said resistance element having a resistance between one end of the element and an intermediate node which varies in a predetermined manner with the position of the fluid in the chamber;

means for damping the flow of the fluid to reduce the rate of change of the resistance of each of the slope detectors caused by movement of the axles and thereby to render the detectors substantially insensitive to axle vibration associated with road travel;

comparator means responsive to the resistances of the first and second slope detectors for generating a signal corresponding to the imbalance between the slope of the first axle and the slope of the second axle;

alarm means for activating an alarm in response to the signal generated by the comparator means;

delay circuit means for preventing the alarm means from activating the alarm until the signal generated by the comparator means has persisted for a predetermined time interval; and means for resetting the delay circuit means upon termination of the signal generated by the comparator means, whereby signals corresponding to temporary imbalance caused by movement of the axles are substantially prevented from activating the alarm.

7. The device of claim 6 wherein the delay circuit means includes means for varying the predetermined time interval in response to the magnitude of the imbalance in slope between the first and second axles, whereby the time interval is made shorter for larger differences in slope.

8. The device of claim 6 wherein the chamber of each of the slope detectors is adapted to confine the conducting fluid to frictionally retard movement of the conductive fluid and thereby the damp the response of the slope detector.

9. The device of claim 8 where the cross-sectional area of each of the chambers is about one-thirty-second of a square inch and the conducting fluid includes mercury.

10. The device of claim 6 wherein the chamber of each of the slope detectors is curved in a substantially circular arc.

* * * * *